Patented June 29, 1943

2,323,131

UNITED STATES PATENT OFFICE 2,323,131

ALDEHYDE CONDENSATION PRODUCT OF RESIDUAL ETHERS OF CASHEW NUT SHELL LIQUID

Mortimer T. Harvey, East Orange, N. J., assignor to The Harvel Corporation, a corporation of New Jersey No Drawing. Application November 10, 1939, Serial No. 303,815

1 Claim. (Cl. 260—46)

The present invention relates to condensation products of an aldehyde or equivalent material with a thick residue obtained and left by the distillation of cashew nut shell liquid, or similar material, with the aid of steam or of reduced pressure; and the present invention relates to methods and steps for obtaining the products of the present invention.

Cashew nut shell liquid is destructively distilled with steam, for example, at between 230° F. and 300° F. to bring over a phenol which is insoluble in water and insoluble in alkaline solutions and in the residue left after the distillate is a phenolic compound which is insoluble in water and insoluble in alkaline solutions. The residue and the distillate phenols are each reactive with aldehydes (e. g. formaldehyde) to produce resinous condensation products.

When about 50% to about 75% of the cashew nut shell liquid has been removed at temperatures below about 500° F. by destructive distillation either with or without steam and at normal pressure or at reduced pressure the residue is of heavier viscosity than cashew nut shell liquid, and with the greater degree of distillation reaches a thick tarry state. When about 25% to about 50% of the cashew nut shell liquid is removed by destructive distillation with steam at temperatures below 550° F. at normal pressures, or at pressures lower than normal, without or with steam, the residue is still thicker than cashew nut shell liquid and is suitable for the practice of the present invention.

Other examples of aldehydes and of reactive methylene group containing agents are acetaldehyde, paraformaldehyde and other polymers of formaldehyde, furfuraldehyde and hexamethylene tetramine.

Also, the cashew nut shell liquid, before being distilled, can have naturally occurring metals removed therefrom and then distilled, e. g., with steam at from about 230° F. to about 300° F., for example, at atmospheric pressure to remove from about 25% to about 75% thereof as a distillate, after which the residue is condensed with an aldehyde or a reactive methylene group containing agent to form condensation products of resinous nature. A method of removing naturally occurring metals is described in U. S. Patents, Numbers 2,067,919 and 2,128,247, to which reference is hereby made. The said patents also describe methods of polymerizing cashew nut shell liquid with or without the removal of the precipitated metals. The same or similar processes can be used to polymerize the cashew nut shell liquid distillation residue to various states between the liquid state and a solid state. Also, the residue can be both polymerized and condensed with an aldehyde or a reactive methylene group containing agent, and these two reactions can be carried on simultaneously or either one before the other.

The cashew nut shell liquid can be treated with from about ½% to about 10% of its weight of sulphuric acid to a liquid polymer, heavier than raw cashew nut shell liquid. The naturally occurring metals can be removed or for some purposes can be left in the polymerized cashew nut shell liquid. Further, polymerization by the sulphuric acid can be prevented by neutralization with caustic soda or sodium carbonate for example. The so treated cashew nut shell liquid can then be distilled to remove from about 25% to about 75% thereof as a distillate and the residue can be subjected to condensation with an aldehyde or a reactive methylene group containing agent or to both of these reactions simultaneously. The destructive distillation can be done with or without steam below about 550° F. at atmospheric or lower pressures. Diethyl sulphate or acid ethyl sulphate can be used with or in place of sulphuric acid for the polymerization steps described above.

Marking nut shell liquid and japanese lac can be treated by the steps above described for cashew nut shell liquid.

Also, hydrocarbon ethers of cashew nut shell liquid or marking nut shell liquid or urushiol can be treated by the steps above described for cashew nut shell liquid. Examples of these ethers are the propyl, butyl, amyl and phenyl.

The present application is a continuation-in-part of my copending application Serial Number 138,373 filed April 22, 1937, now Patent No. 2,218,531.

Having thus described my invention, what I claim as new and desire to protect by Letters Patent is:

The condensation product of an aldehyde and the residual product obtained by the method of first forming a hydrocarbon ether at the hydroxyl oxygen of cashew nut shell liquid and then destructively distilling to remove between 25% and 75% of the cashew nut shell liquid ether.

MORTIMER T. HARVEY.